US012793919B2

(12) United States Patent
Guidry, II et al.

(10) Patent No.: US 12,793,919 B2
(45) Date of Patent: Nov. 10, 2026

(54) INTELLIGENT CONTACTOR LATCHING BLOCK

(71) Applicant: Schneider Electric USA, Inc., Andover, MA (US)

(72) Inventors: John Guidry, II, Andover, MA (US); Ryan Hess, Andover, MA (US)

(73) Assignee: Schneider Electric USA, Inc., Andover, MA (US)

( * ) Notice: Subject to any disclaimer, the term of this patent is extended or adjusted under 35 U.S.C. 154(b) by 188 days.

(21) Appl. No.: 18/791,852

(22) Filed: Aug. 1, 2024

(65) Prior Publication Data

US 2026/0038758 A1 Feb. 5, 2026

(51) Int. Cl.
*H01H 47/22* (2006.01)

(52) U.S. Cl.
CPC .................................... *H01H 47/22* (2013.01)

(58) Field of Classification Search
CPC ........ H01H 47/22; H01H 51/10; H01H 50/32; H01H 50/321
See application file for complete search history.

(56) References Cited

U.S. PATENT DOCUMENTS 2,478,691 A * 8/1949 Garrigan ................ H01H 51/10 335/170
2,715,706 A 8/1955 Chin
2,840,662 A 6/1958 Jessee
2,942,080 A * 6/1960 Hodgson ................ H01H 51/10 335/174
3,188,529 A * 6/1965 Byrnes ................... H01H 51/10 327/482
4,307,361 A 12/1981 Grunert et al.
4,987,513 A * 1/1991 Shelley .................. H01H 47/18 361/89
7,843,293 B1 * 11/2010 Bonjean ................... H01H 3/28 218/154

(Continued)

FOREIGN PATENT DOCUMENTS

CN 2178399 Y 9/1994
EP 3748661 A1 12/2020

(Continued)

OTHER PUBLICATIONS

Extended European Search Report issued in EP Application No. 25191354.7, mailed Dec. 11, 2025, 14 pages.

*Primary Examiner* — Scott Bauer
(74) *Attorney, Agent, or Firm* — FIG. 1 Patents

(57) ABSTRACT

A system includes an electrical contactor that is biased to the open circuit position. A latching block includes a latch member operatively connected to a latch actuator. The latch actuator is configured to actuate to a latched position mechanically blocking movement of the electrical contactor from the closed circuit position to the open circuit position, and to an unlatched position allowing free movement of the electrical contactor back and forth between the open and closed positions. The latch member maintains latching of the electrical contactor in the closed circuit position without need for power consumption by the contact actuator or the latch actuator. The latching block includes a power storage for actuating the latch member from the latched position to the unlatched position in the event of loss of line power to prevent unexpected start of a load after line power is restored.

20 Claims, 6 Drawing Sheets

(56) References Cited

U.S. PATENT DOCUMENTS

| | | | | |
|---|---|---|---|---|
| 11,640,887 | B2 | 5/2023 | Delpozzo et al. | |
| 2003/0208961 | A1 * | 11/2003 | Griffin | E05F 15/668 49/141 |
| 2009/0316324 | A1 * | 12/2009 | Scripca | A01G 25/16 361/160 |

FOREIGN PATENT DOCUMENTS

| | | | |
|---|---|---|---|
| KR | 2000-0015649 | A | 3/2000 |
| KR | 101042988 | B1 | 6/2011 |
| KR | 101378479 | B1 | 3/2014 |

* cited by examiner

INTELLIGENT CONTACTOR LATCHING BLOCK

BACKGROUND

1. Field

The present disclosure relates to power control, and more particularly to contactors for connecting loads such as motors to power sources such as line power, and for safely disconnecting the loads from the power sources.

2. Description of Related Art

Traditional contactors for loads such as industrial motors maintain power on the contactors to keep them in the ON state. This way, when there is a loss of line power, the contactors will switch to the OFF state so that when line power returns, there will be no unexpected start of the industrial motor. This safety feature comes a cost, however. A considerable amount of power is required to keep the contactors in the ON state during normal operation.

In applications where unexpected starts are not a safety issue, such as in lighting applications, the constant power consumption is not required to keep the contactors in the ON state. In such applications, the contactors are mechanically stable, e.g. latched, in the ON position so that it is not necessary to expend power on the contactors in normal operation. While this reduced power consumption, it is not typically suitable for applications like industrial motors. Since the contacts remain in the ON position even after a loss of line power, when the line power is restored, the load will power on unexpectedly.

The conventional techniques have been considered satisfactory for their intended purpose. However, there is an ever-present need for improved systems and methods for operating contactors to improve safety and reduce power consumption. This disclosure provides a solution for this need.

SUMMARY

A system includes an electrical contactor having a closed position with a first contact in physical and electrical contact with the second contact to close a circuit for powering a load in an ON state and an open position with the first contact spaced apart from a second contact to open the circuit for depowering the load in an OFF state. The electrical contactor includes a contact actuator operatively connected to drive the first contact back and forth between the closed and open positions. The contact actuator is biased to the open position.

A latching block includes a latch member operatively connected to a latch actuator configured to actuate the latch member back and forth between a latched position mechanically latching to block movement of the first contact from moving from the closed position to the open position, and an unlatched position configured to allow free movement of the first contact back and forth between the open and closed positions. In the latched position, the latch member maintains the first and second contacts in the closed position without need for power consumption by the contact actuator. The latching block includes a power storage. The latch actuator is operatively connected to the power storage to actuate the latch member from the latched position to the unlatched position using power from the power storage. A controller is operatively connected to control charging of the power storage and actuation of the latch actuator wherein in an event of loss of line power to the electrical contactor. The controller is configured to supply power from the power storage to the latch actuator to unlatch the electrical contactor to prevent unexpected start of a load after line power is restored.

The latch actuator can include a bistable mechanism. In a first stable position, the latch member can be stable in the latched position without need for expending power, e.g. other than for monitoring. In a second stable position, the latch member can be stable in the an unlatched position without need for expending power. The latch actuator can consume power to move the bistable mechanism between the first and second stable positions, and between the second and first stable positions.

The latch block can include a first connector for connecting the latch block to a positive power wire, a second connector for connecting the latch block to a negative power wire, a third connector for connecting to a positive coil connector of the electrical contactor, a fourth connector for connecting to a negative coil connector of the electrical contactor, and a switching device electrically connected to the first connector and operatively connected to an unlatch circuit and to the third connector. The switching device can be configured to switch between a first state and a second state. In the first state, the switching device can connect the first connector electrically to the third connector. In the second state, the switching device can connect the first connector electrically to the unlatch circuit. With the switching device in the first state, the latching block can energize the contact actuator. In the second state, the latching block can deenergize the contact actuator and can energize the unlatch circuit.

The controller can be configured to cause the controller to detect a loss of power supplied to the first and second connectors, to supply power to the unlatch circuit to move the latch member to the unlatched position, and to place the switching device into the first state for energizing the contact actuator upon return of power to the first and second connectors. The controller can be configured to delay actuating the latch member to the latched position after return of power to the first and second contactors until the energy storage is sufficiently charged to actuate the latch member from the latched position to the unlatched position for a future unlatching event.

The latching block can be an add-on module for the electrical contactor. The electrical contactor can be configured to, in the absence of the latching block, energize the contact actuator to move the first contactor the closed position when power is supplied to the positive and negative coil connectors and to deenergize the contact actuator to return the first contactor to the open position any time power is not supplied to the positive and negative coil connectors.

A latching block for an electrical contactor includes a latch member operatively connected to a latch actuator configured to actuate the latch member back and forth between a latched position mechanically latching to block movement of a first contact of the electrical contactor from moving from the closed position to the open position, and an unlatched position configured to allow free movement of the first contact back and forth between the open and closed positions. In the latched position, the latch member is configured to maintain the first and second contacts of the electrical contactor in the closed position without need for power consumption by a contact actuator of the electrical contactor. A power storage is included. The latch actuator is operatively connected to the power storage to actuate the latch member from the latched position to the unlatched position using power from the power storage. A controller is operatively connected to control charging of the power storage and actuation of the actuator. In an event of loss of line power to the electrical contactor, the controller is configured to supply power from the power storage to the latch actuator to unlatch the electrical contactor to prevent unexpected start of a load after line power is restored.

The latch actuator can include a bistable mechanism wherein in a first stable position, the latch member can be stable in the latched position without need for expending power. In a second stable position, the latch member can be stable in the an unlatched position without need for expending power. The latch actuator can consume power to move the bistable mechanism between the first and second stable positions, and between the second and first stable positions.

The latch block can include: a first connector for connecting the latch block to a positive power wire; a second connector for connecting the latch block to a negative power wire; a third connector for connecting to a positive coil connector of the electrical contactor; a fourth connector for connecting to a negative coil connector of the electrical contactor; and a switching device electrically connected to the first connector and operatively connected to an unlatch circuit and to the fourth connector. The switching device can be configured to switch between a first state connecting the first connector electrically to the third connector and a second state connecting the first connector electrically to the unlatch circuit. With the switching device in the first state, the latching block can energize the contact actuator. In the second state, the latching block can deenergize the contact actuator and can energize the unlatch circuit.

The controller can be configured to cause the controller to: detect a loss of power supplied to the first and second connectors; supply power to the unlatch circuit to move the latch member to the unlatched position and charge the energy storage; and place the switching device into the first state for energizing the contact actuator upon return of power to the first and second connectors. The controller can be configured to delay actuating the latch member to the latched position after return of power to the first and second contactors until the energy storage is sufficiently charged to actuate the latch member from the latched position to the unlatched position for a future unlatching event.

The latching block can be an add-on module for the electrical contactor. The electrical contactor can be configured to, in the absence of the latching block, energize the actuator to move the first contactor the closed position when power is supplied to the positive and negative coil connectors and to deenergize the actuator to return the first contactor to the open position any time power is not supplied to the positive and negative coil connectors. Each of the first and second connectors can include a respective lug. Each of the third and fourth connectors can include a respective lug configured to connect the latching block via respective wires to reciprocal lugs of the electrical contactor, or the wires can be permanently mounted to the latch block.

A method includes detecting a loss of line power conducted through latched contacts of an electrical contactor. The method includes, in response to the loss of line power, drawing stored power from a power storage to unlatch the contacts, allowing the contacts to separate from one another under a bias force.

The method can include, prior to detecting the loss of line power, conducting line power through the contacts of the electrical contactor without expending power to maintain the contacts in a closed contact with one another. The method can include, prior to detecting the loss of line power, maintaining a latched state of the contacts without expending power to maintain a latching unit in a latched position that latches the contacts in closed contact with one another. The method can include maintaining the contacts in an open, separated state after return of line power until after receiving a command to close the contacts. Subsequent to a return of line power after the loss of line power, the method can include initiating recharging of the power storage.

The method can include completing recharging of the power storage, wherein recharging of the power storage is complete upon enough energy being stored in the power storage to unlatch the contacts without use of line power. The method can include delaying latching the contacts until after completion of recharging of the power storage, even if the contactors cycle between open and closed contact positions during recharging the power storage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
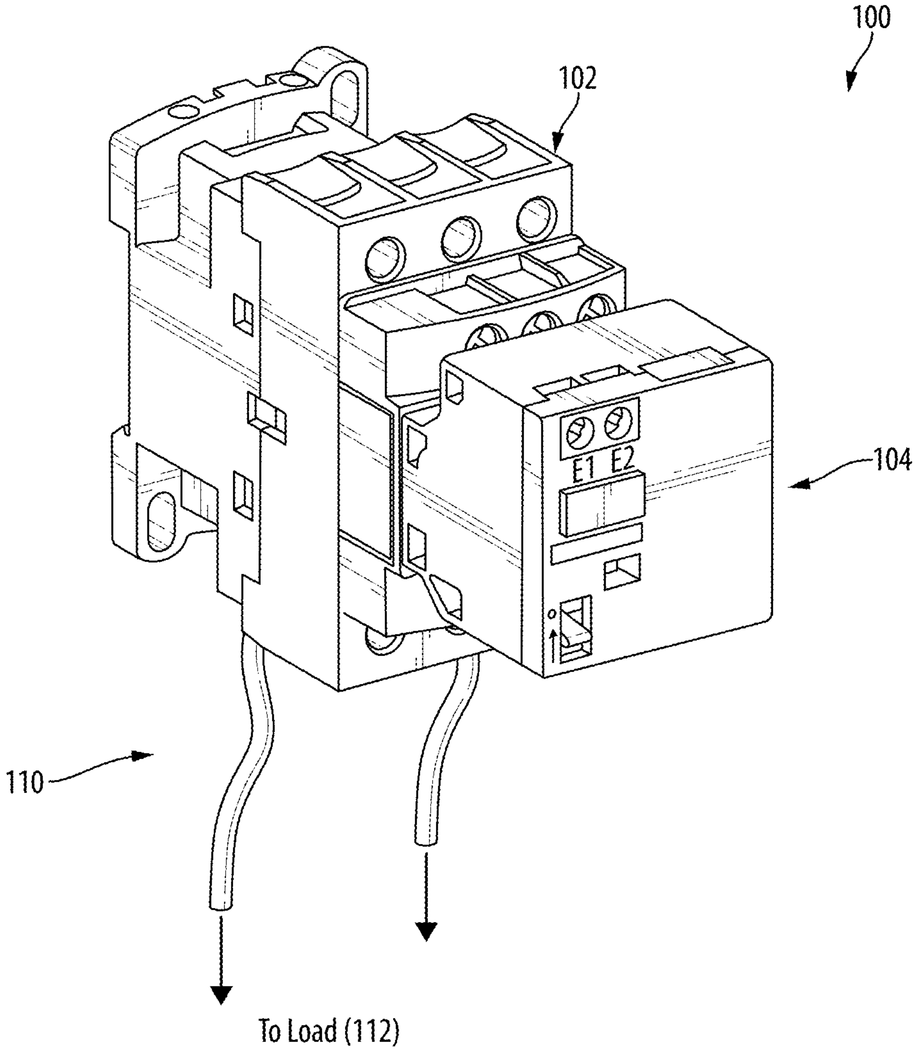
FIG. 1 is a schematic perspective view of an embodiment of a system constructed in accordance with the present disclosure, showing the electrical contactor and the latching block.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide for zero or near zero power consumption to maintain electrical contactors in a closed contactor state for normal operation, and to prevent unexpected load starts after a loss of line power.

The system 100 includes an electrical contactor 102 and a latching block 104. The electrical contactor 102 has a closed position with a first contact 106 in physical and electrical contact with the second contact 108 to close a circuit 110 for powering a load 112 in an ON state as shown schematically in FIG. 7. The electrical contactor 102 also has an open position with the first contact 106 spaced apart from a second contact 108 to open the circuit 110 for depowering the load 112 in an OFF state, as shown in FIG. 6.

Figure 2:
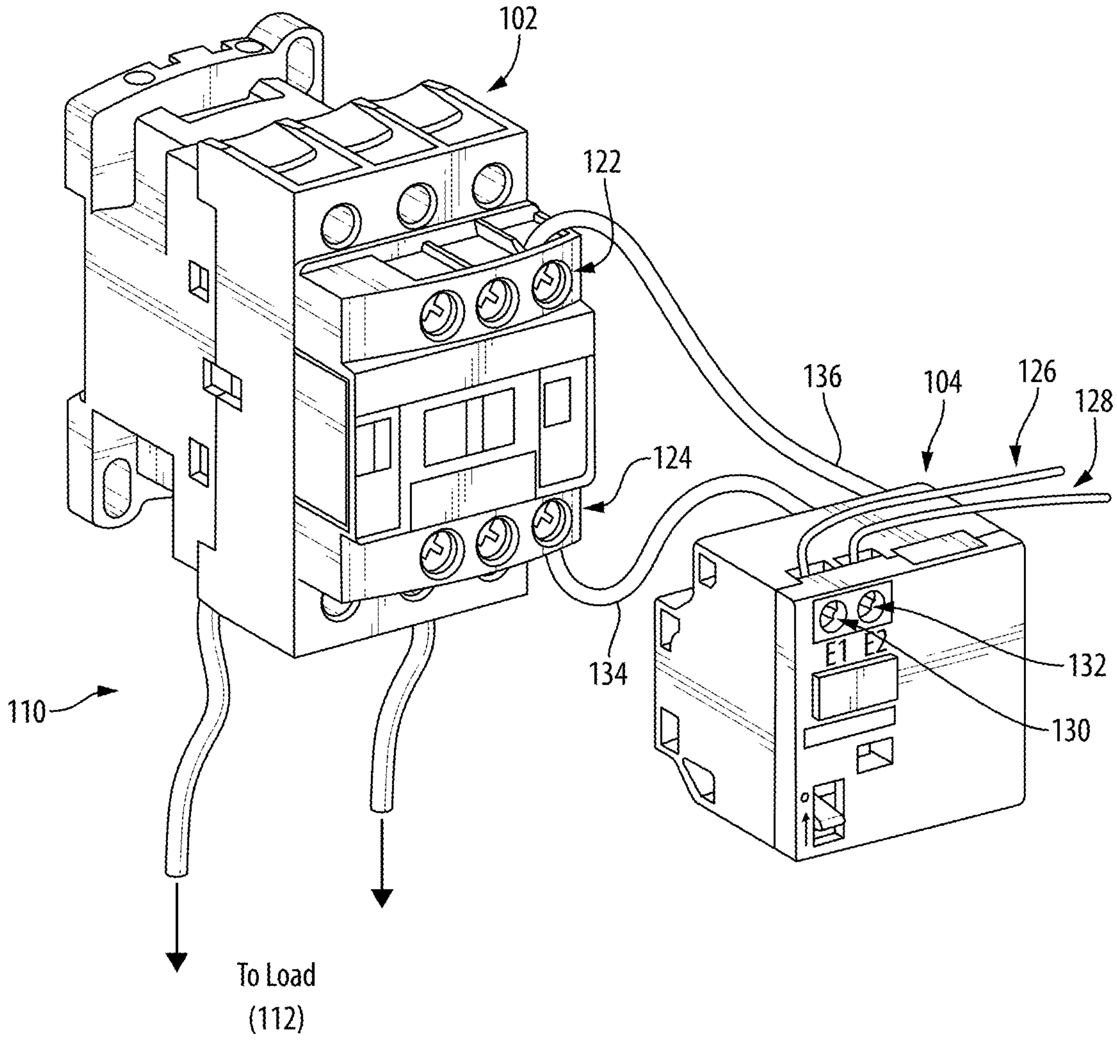
FIG. 2 is an exploded perspective view of the system of FIG. 1, schematically showing the wiring of the electrical contactor and latching block.

With reference to FIG. 2, the latching block 104 can be provided as a separate add-on module for the electrical contactor 102. Those skilled in the art will readily appreciate that the latching block 104 can optionally instead be manufactured in a common housing with the electrical contactor 102 as an integrated whole. The electrical contactor 102 is configured to, in the absence of the latching block, energize the latch actuator 120 (labeled in FIGS. 6-7) to move the first contact 106 the closed position shown in FIG. 7 when power is supplied to the positive and negative coil connectors 122, 124, e.g. lugs (labeled in FIG. 2), and to deenergize the latch actuator 120 to return the first contact 106 to the open position shown in FIG. 6 any time power is not supplied to the positive and negative coil connectors 122, 124. To retrofit a standalone electrical contactor 102 to incorporate a latching block 104, the control wires 126, 128 for two-wire (ON/OF) control of the electrical contactor 102 can be removed from their connectors 122, 124 and can be instead connected to the lugs or connectors 130, 132 of the latching block 104. Jumper wires 134, 136 can connect from lugs in the latching block 104 to the connectors 122, 124 of the contactor block, or can be integrated into the latching block 104. The latching block 104 can be mounted to an outward face of the electrical contactor 102 as shown in FIG. 1.

The electrical contactor 102 includes a contact actuator 114 (labeled in FIGS. 6 and 7) operatively connected to drive the first contact 106 back and forth between the closed and open positions. The contact actuator is biased to the open position, as represented schematically by the spring 116 which is stretched more in FIG. 7 in the ON state than it is in FIG. 6 in the OFF state.

Figure 6:
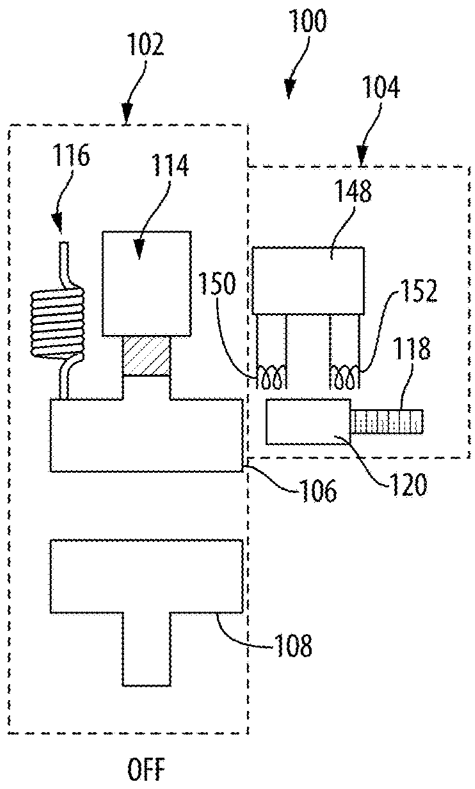
FIG. 6 is a schematic view of the system of FIG. 1 showing the latch and contact position for the OFF state.
Figure 7:
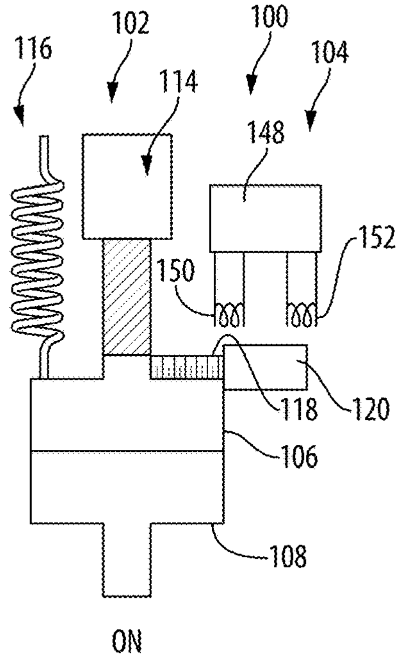
FIG. 7 is a schematic view of the system of FIG. 6, showing the latch and contact position for the latched ON state.

With reference to FIGS. 6-7, the latching block 104 includes a latch member 118 operatively connected to a latch actuator 120 configured to actuate the latch member back and forth between a latched position, shown in FIG. 7, mechanically latching to block movement of the first contact 106 from moving from the closed position to the open position, and an unlatched position (shown in FIG. 6) configured to allow free movement of the first contact 106 back and forth between the open and closed positions. In the latched position of FIG. 7, the latch member 118 maintains the first and second contacts 106, 108 in the closed position without need for power consumption by the contact actuator 114. In the latched position, the controller 140 can still monitor the control signal voltage which consumes only a modest amount of power.

Figure 3:
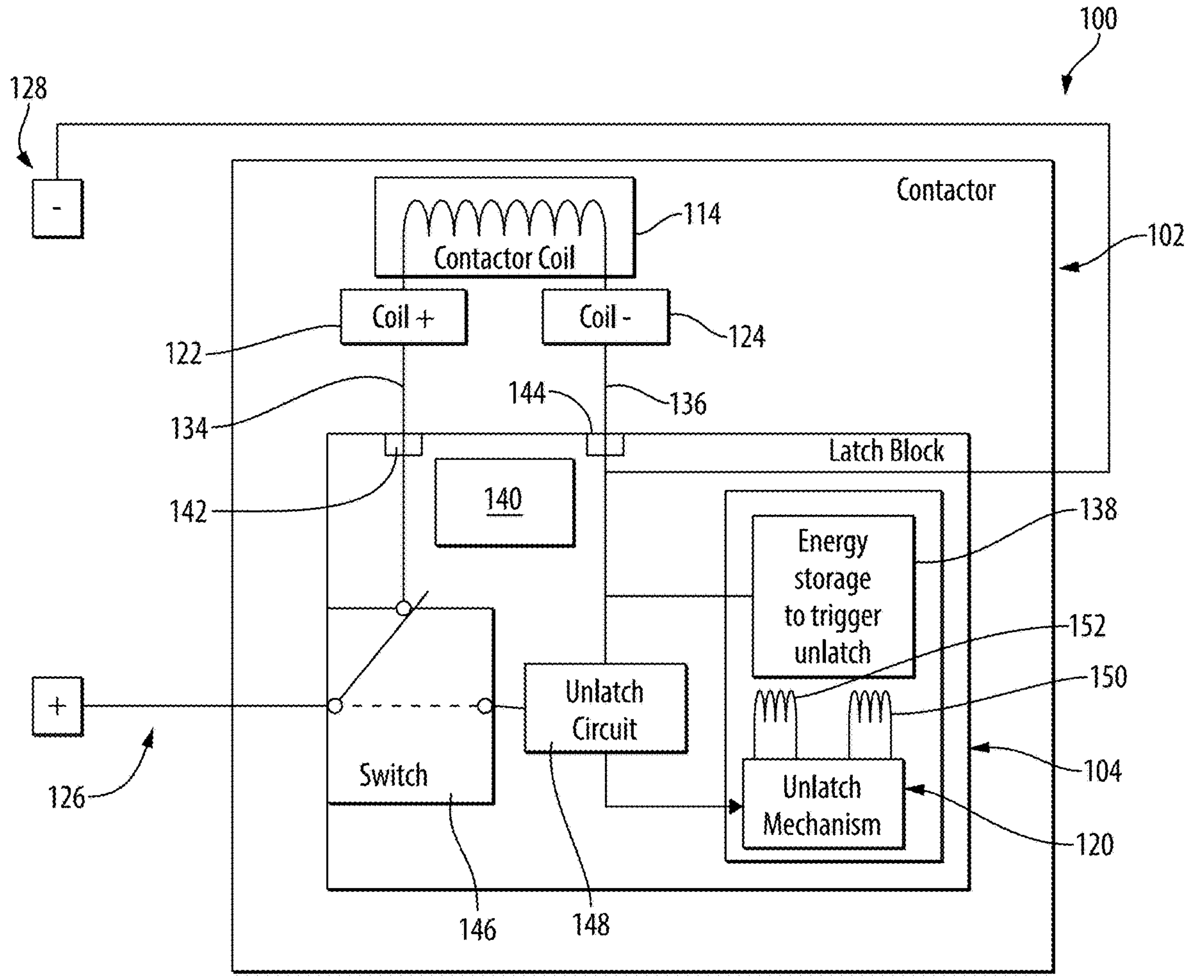
FIG. 3 is a schematic view of the system of FIG. 1, showing the energy storage, the unlatch circuit, and the unlatch mechanism.

With reference now to FIG. 3, the latching block 104 includes a power storage 138, e.g. a a bank of one or more capacitors, a bank of one or more supercapacitors, a battery, and/or the like. The latch actuator 120 is operatively connected to the power storage 138 to actuate the latch member 118 from the latched position of FIG. 7 to the unlatched position of FIG. 6 using power from the power storage 138. A controller 140 is operatively connected to control charging of the power storage 138 and actuation of the latch actuator 120. In the event of loss of line power to the electrical contactor 102, e.g. in a power outage, the controller 140 is configured to supply power from the power storage 138 to the latch actuator 120 to unlatch the electrical contactor 102 to prevent unexpected start of the load 112 (labeled in FIGS. 1-2) after line power is restored.

The latch actuator 120 includes a bistable mechanism. In a first stable position, e.g. shown in FIG. 7 the latch member 118 is stable in the latched position without need for expending power. In a second stable position, e.g. shown in FIG. 6, the latch member is stable in the an unlatched position without need for expending power. The latch actuator 120 can consume power to move the bistable mechanism between the first and second stable positions, and between the second and first stable positions. The power for unlatching can be supplied from the power storage 138, and the power for latching can be provided from the control wires 126, 128.

With continued reference to FIG. 3, the latch block 104 includes a first connector 130 for connecting the latch block 104 to a positive power wire, e.g. a positive wire of a pair for two-wire control, a second connector 124 for connecting the latch block 104 to a negative power wire, e.g. the negative wire of a pair for two-wire control, a third 142 connector for connecting to the positive coil connector 122 of the electrical contactor 102, and a fourth connector 144 for connecting to a negative coil connector 124 of the electrical contactor 102. Each of the third and fourth connectors 142, 144 includes a respective lug configured to connect the latching block 104 via respective wires 134, 136 of FIG. 2 to reciprocal lugs, e.g. connectors 122, 124 of the electrical contactor 102 as shown in FIG. 2, or in lieu of lugs, respective wires can be permanently mounted in place.

Figure 4:
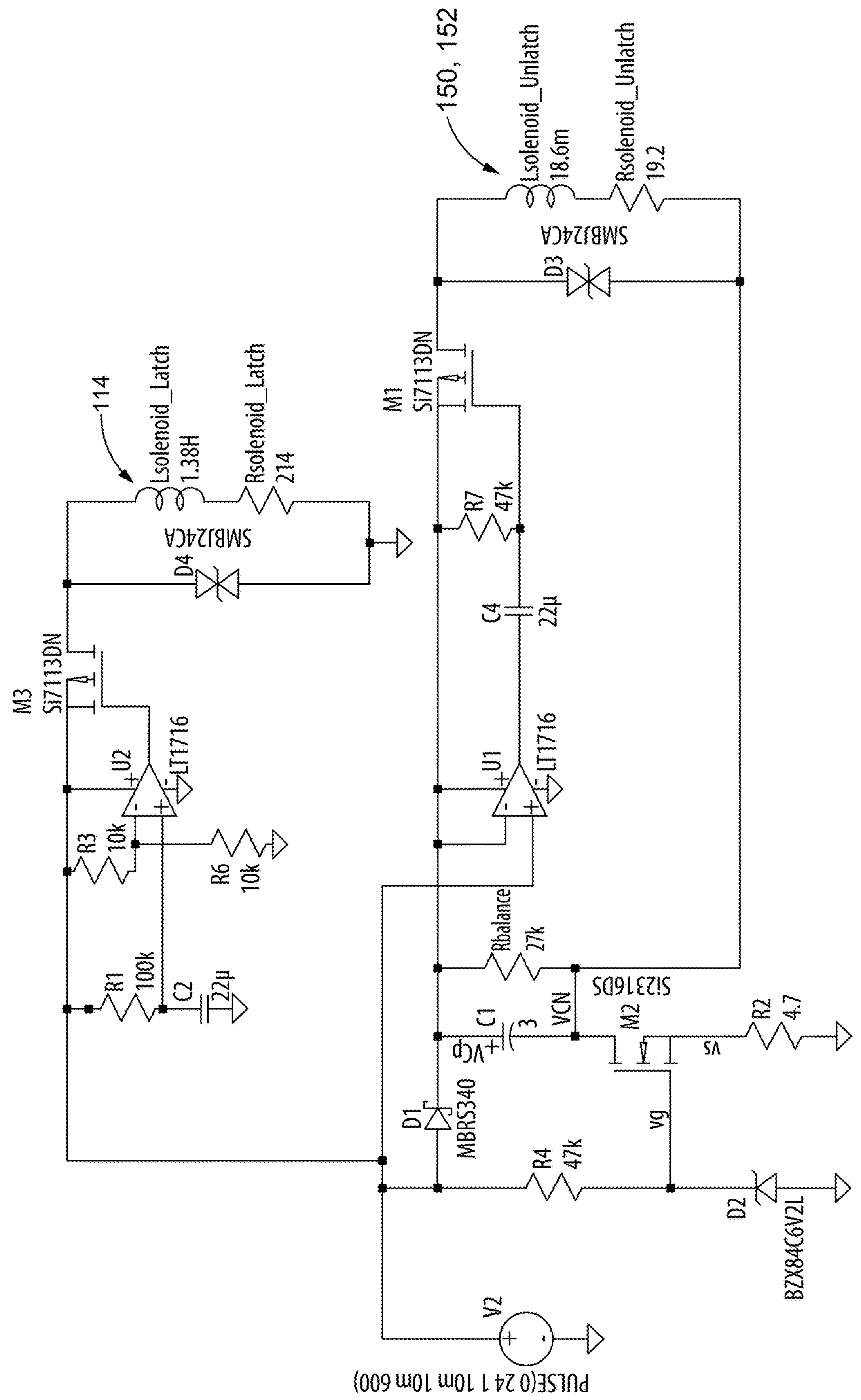
FIG. 4 is a circuit diagram of an example of the unlatch circuit, showing the latch solenoid and the unlatch solenoid for a bistable latch/unlatch mechanism.
Figure 8:
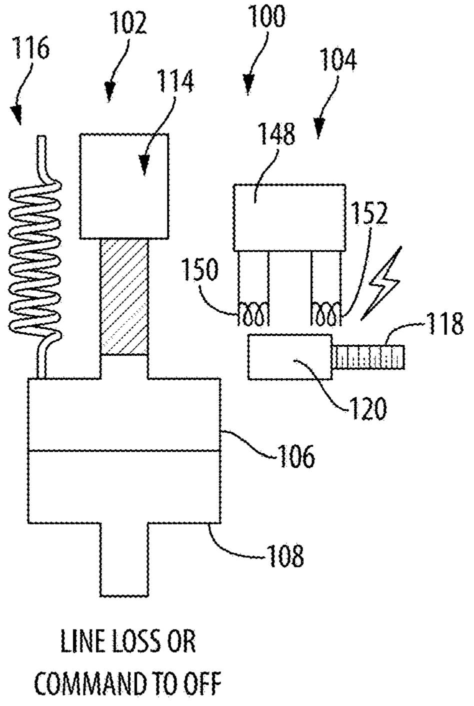
FIG. 8 is a schematic view of the system of FIG. 7, schematically showing unlatching of the contacts.
Figure 9:
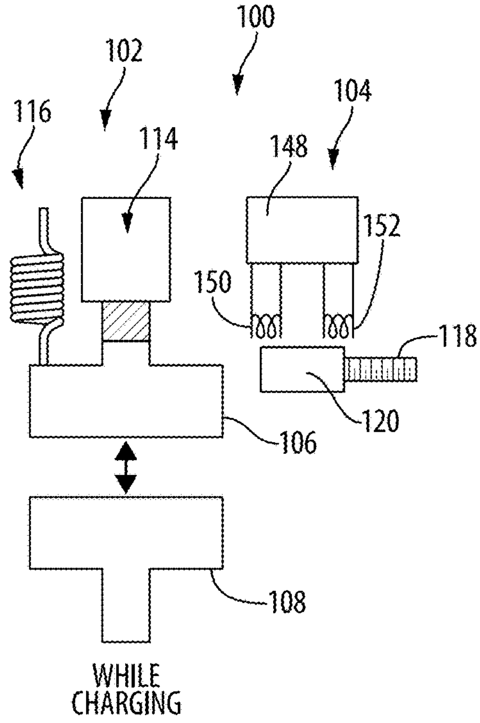
FIG. 9 is a schematic view of the system of FIG. 7, showing the contacts opened in the unlatched state, with an arrow indicating possible rapid opening and closing of the contacts without latching while the power storage of the latch block is charging.

With reference again to FIG. 3, the latch block 104 includes a switching device 146 electrically connected to the first connector 130 and operatively connected to an unlatch circuit 148 and to the third connector 142. The switching device 146 is configured to switch between a first state and a second state. In the first state shown in FIG. 3, the switching device 146 connects the first connector 130 electrically to the third connector 142 for powering the coil of the contact actuator 114. In the second state, indicated in FIG. 3 with the broken line, the switching device 146 connects the first connector 130 electrically to the unlatch circuit 148, which can act as a phantom coil when the contactor actuator 114 is not being powered. With the switching device 146 in the first state, the latching block 104 energizes the contact actuator 114. In the second state, the latching block 104 deenergizes the contact actuator 114 and energizes the unlatch circuit 148 and charges the power storage 138. The unlatch actuator 120 includes a latch coil or coils 150, 152 configured to pull or push the latch member 118 into the first bistable position when powered as shown in FIG. 7, and configured to pull or push the latch member 118 into the second bistable position when powered as shown in FIGS. 6, 8, and 9. Those skilled in the art will readily appreciate that the coils 150, 152 can be replaced with a single coil, and in order to change the direction the polarity of the pulse can be reversed. FIG. 4 shows an example of an unlatch circuit 148, although those skilled in the art will readily appreciate that any suitable specific circuit configuration can be used that is capable of performing the functions disclosed herein, for energizing and deenergizing the latch and unlatch coil or coils 150, 152.

The controller 140 is configured, e.g. including machine readable instructions, digital code, digital logic, analog logic, or the like, to cause the controller 140 function as follows. The controller 140 can detect a loss of power supplied to the first and second connectors 130, 132, which could result from a loss of line power or from a user or automated command to turn contractor 102 to the OFF state. In response to the loss of power to the connectors 130, 132, the controller can supply power to the unlatch circuit 148 to move the latch member 118 (labeled in FIGS. 6-9) to the unlatched position as in FIGS. 6, 8, and 9; and can place the switching device 146 into the first state shown in FIG. 3 for energizing the contact actuator 114 upon return of power to the first and second connectors 130, 132. The controller 140 is configured to delay actuating the latch member 118 to the latched position shown in FIG. 7 after return of power to the first and second contacts 106, 108 until the energy storage 138 is sufficiently charged to actuate the latch member 118 from the latched position of FIG. 7 to the unlatched position of FIGS. 6 and 8-9 for a future unlatching event. The controller 140 is also in control of the switching device 146, which can be a solid state switch. Using the bistable mechanism and delaying latching until after the energy storage 138 has sufficient charge to guarantee unlatching enables an operator or automated control to perform a rapid ON/OF cycle on the control at connectors 130, 132 after a line loss, while always ensuring there is enough power to unlatch in the next loss of line power.

With reference now to FIGS. 5-9, FIG. 5 shows a timing diagram for a commanded ON/OFF cycle of the electrical contactor 102 from time t0 to t3, a commanded ON cycle followed by a loss of line power and uncommanded OFF cycle from time t4 to t6, restoration of line power at time t7, and a rapid commanded ON/OFF cycle from time t7 to t9. States are shown for line power, load 112 (labeled in FIGS. 1-2), the contacts 106, 108, the control signal in wires 126, 128 of FIG. 2, power consumption of the contactor coil of the contact actuator 114, the unlatch circuit 146 of FIG. 3, charge state of the power storage 138 of FIG. 3, and state of the bistable latch mechanism of FIG. 3. FIGS. 6-9 show schematic representations of the electrical contactor 102 and the latch block 104 corresponding to various events on the timeline of FIG. 5.

Figure 5:
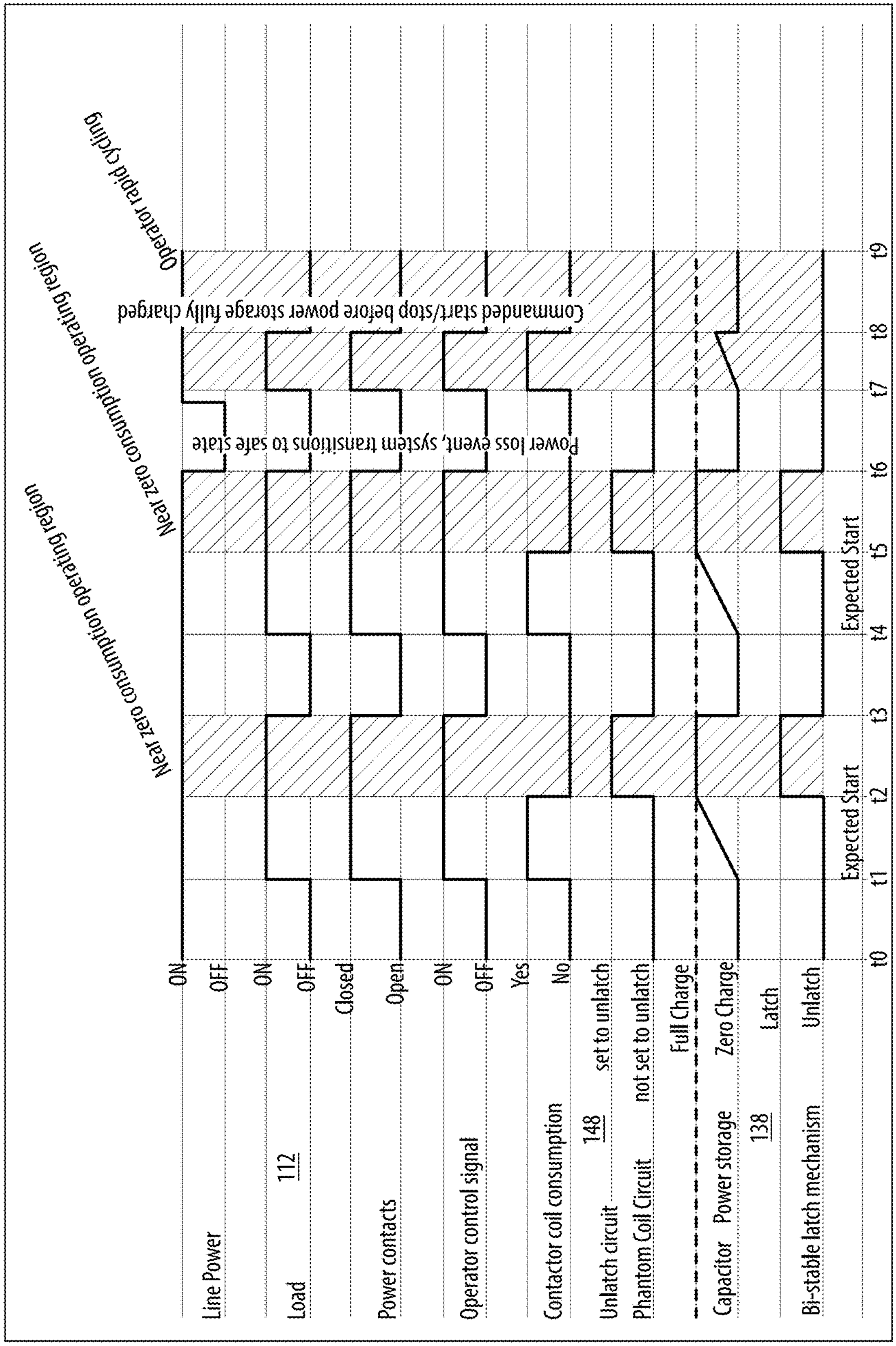
FIG. 5 is a timing diagram showing states of components of the system of FIG. 1 for expected starts, normal operation, power losses, and a commanded contact closure and opening that are too fast for adequate charging of the power storage of the latch block.

The initial condition at time t0 in FIG. 5 is that line power is ON, but the load is OFF, the contacts 106, 108 are open, the command signal is OFF, the contactor coil is not consuming power, the unlatch circuit 148 is disconnected (at the switching device 146 of FIG. 3), the power storage 138 is discharged, and the bi-stable latch mechanism is unlatched, as shown in FIG. 6.

At time t1 there is a command to the ON state, e.g. an expected or commanded start from an operator or automated control system, via the command signal. The latching block 104 energizes the coil of the contact actuator 114 to bring the contacts 106, 108 to the closed position, powering on the load 112. The latching block 104 charges the power storage 138 while the bi-stable latch mechanism remains in the unlatched stage.

By time t2, the power storage 138 has attained sufficient charge to store power available to eventually unlatch the latch member 118 in the absence of line power, so the latching block 104 latches the contacts 106, 108 in the closed state with the bistable mechanism of the latch member 118 in the latched position after energizing the latch coil or coils 150, 152 and the contactor coil consumption ends. The switching device 146 switches from connecting to the contactor coil of the contact actuator 114 to connecting to the unlatch circuit 148. FIG. 7 shows the contacts 106, 108 and latch member 118 in this ON state. The unlatch circuit 148 is set to a state ready to unlatch if needed. The gray area from time t2 to t3 indicates that there is no power supplied to the contact actuator 114 or to the latch actuator 120. This represents the normal operational state for the load 112 and system 100.

At time t3, there is a command to the OFF state, e.g. an expected or commanded stop from an operator or automated control system, via the command signal. The line power remains ON, but the load 112 is depowered. The contacts 106, 108 are separated to the open state because the latch member moves to the unlatched bistable position shown in FIG. 6 by energizing the unlatch coil or coils 150, 152. At time t3, the system 100 is at the same state as at time t0. At time t4, there is a another commanded start just as at time t1 described above, and normal operation resumes at time t5, which is the same system state as described above for time t2.

At time t6 there is an uncommanded, unexpected loss of line power. The latching block 104 detects this as a loss of power in the command signal. The load 112 is depowered, the power contacts 106, 108 separate to the open state under the biasing force, e.g. of the spring 116, because the unlatch circuit routes power from the power storage 138 to the unlatch coil or coils 150, 152 of the latch actuator 120, moving the latch member 118 to the unlatched bistable position. FIG. 8 schematically depicts this movement of the latch member 118 under energizing the unlatch coil or coils 150, 152, freeing the contact 106 to move away from the contact 108 under the biasing force acting on the contact 106. The control signal goes to OFF not as a result of an operator or automated control command, but because loss of line power also removes the power to the control wires. The energy stored in the power storage 138 is depleted, and until line power is restored, it remains depleted. Additionally at this time the switch 146, e.g. a transistor, is connected again to the contactor coil, awaiting the command to close the contactor 102.

Just before time t7, although those skilled in the art will readily appreciate that the time steps as depicted in FIG. 5 need not be considered to be equal in scale, the line power is restored at an unexpected time. However, there is no uncommanded or unexpected powering ON of the load 112 because just before time t7, the contacts 106, 108 are still biased open and the control signal is still OFF. Via the switching device 146, the coil of the contact actuator 114 is connected instead of the unlatch circuit 114, and the unlatch circuit 148 remains unset, i.e. it cannot latch. The power storage 138 remains depleted, and the bistable mechanism remains in the unlatched position. When the command is sent to dump the stored energy into unlatch solenoid 150, 152, at this same time the switch 146 is moved back to the contactor coil.

At time t7, there is a commanded start via the two-wire control signal. The load 112 is briefly powered as the contacts 106, 108 are closed and consuming power to remain so briefly. The power storage 138 begins to charge, but only achieves partial charge, so the bistable mechanism remains unlatched. Shortly following the commanded start at time t7, there is a commanded stop at time t8, before the power storage 138 is fully charged. This discharges the power storage 138 and returns the system to the same state as at time t6. This short commanded ON/OFF cycle can be repeated multiple times without latching, as indicated by the double arrow in FIG. 9. Charging the power storage 138 all the way may take a few seconds, e.g. 10 seconds, so the system 100 does not fully reset and latch again until the commanded ON state lasts long enough to fully charge the power storage 138, as in the sequence from time t1, to time t2. This prevents ever reaching the latched state without storing enough power to guarantee adequate power is available to unlatch in the absence of line power.

Given that the coil of the contact actuator 114 does not ever need to draw power except for briefly to close the contacts 106, 108, there is little to no power consumed by system 100 for the vast bulk of the time, whether the load 112 is powered ON or OFF. This considerable reduces the energy consumption of power control equipment and therefore reduces loads on the environmental like carbon dioxide production. The latching block 104 can be part of a retrofit to existing electrical contactors, so not only new installations but existing installations can benefit from the systems and methods disclosed herein.

The methods and systems of the present disclosure, as described above and shown in the drawings, provide for zero or near zero power consumption to maintain electrical contactors in a closed contactor state for normal operation, and for preventing unexpected load starts after a loss of line power. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:

an electrical contactor having a closed position with a first contact in physical and electrical contact with a second contact to close a circuit for powering a load in an ON state and an open position with the first contact spaced apart from the second contact to open the circuit for depowering the load in an OFF state, wherein the electrical contactor includes a contact actuator operatively connected to drive the first contact back and forth between the closed position and the open position, wherein the contact actuator is biased to the open position;

a latching block including a latch member operatively connected to a latch actuator configured to actuate the latch member back and forth between a latched position mechanically latching to block movement of the first contact from moving from the closed position to the open position, and an unlatched position configured to allow free movement of the first contact back and forth between the open position and the closed position, wherein in the latched position, the latch member maintains the first contact and the second contact in the closed position without power consumption by the contact actuator;

a power storage, wherein the latch actuator is operatively connected to the power storage to actuate the latch member from the latched position to the unlatched position using power from the power storage; and a controller operatively connected to control charging of the power storage and actuation of the latch actuator wherein in an event of a loss of line power to the electrical contactor, the controller is configured to supply power from the power storage to the latch actuator to unlatch the electrical contactor to prevent unexpected start of the load after the line power is restored.

2. The system as recited in claim 1, wherein the latch actuator includes a bistable mechanism, and wherein:

while the bistable mechanism is in a first stable position, the latch member is stable in the latched position without expending power;

while the bistable mechanism is in a second stable position, the latch member is stable in the unlatched position; and wherein the latch actuator can consume power to move the bistable mechanism between the first stable position and the second stable position, and between the second stable position and the first stable position.

3. The system as recited in claim 1, wherein the latching block includes:

a first connector for connecting the latching block to a positive power wire;

a second connector for connecting the latching block to a negative power wire;

a third connector for connecting to a positive coil connector of the electrical contactor;

a fourth connector for connecting to a negative coil connector of the electrical contactor; and a switching device electrically connected to the first connector and operatively connected to an unlatch circuit and to the fourth connector, wherein the switching device is configured to switch between a first state connecting the first connector electrically to the third connector and a second state connecting the first connector electrically to the unlatch circuit, wherein with the switching device in the first state the latching block energizes the contact actuator, and in the second state the latching block deenergizes the contact actuator and energizes the unlatch circuit.

4. The system as recited in claim 3, wherein the controller is configured to:

detect a loss of power supplied to the first connector and the second connector;

supply power to the unlatch circuit to move the latch member to the unlatched position; and place the switching device into the first state for energizing the contact actuator upon return of power to the first connector and the second connector.

5. The system as recited in claim 4, wherein the controller is configured to delay actuating the latch member to the latched position after power returns to the first contact and the second contact until the power storage is sufficiently charged to actuate the latch member from the latched position to the unlatched position for a future unlatching event.

6. The system as recited in claim 3, wherein the latching block is an add-on module for the electrical contactor, wherein the electrical contactor is configured to, while the latching block is absent, energize the contact actuator to drive the first contact to the closed position when power is supplied to the positive coil connector and the negative coil connector, and to deenergize the contact actuator to drive the first contact to return to the open position when power is not supplied to the positive coil connector and the negative coil connector.

7. A latching block for an electrical contactor comprising:

a latch member operatively connected to a latch actuator configured to actuate the latch member back and forth between a latched position mechanically latching to block movement of a first contact of the electrical contactor from moving from a closed position, in which the first contact is in physical and electrical contact with a second contact of the electrical contactor, to an open position, in which the first contact is spaced apart from the second contact, and an unlatched position configured to allow free movement of the first contact back and forth between the open position and the closed position, wherein in the latched position, the latch member is configured to maintain the first contact and the second contact of the electrical contactor in the closed position without power consumption by a contact actuator of the electrical contactor;

wherein the latch actuator is configured to be connected to a power storage to actuate the latch member from the latched position to the unlatched position using power from the power storage; and wherein in an event of loss of a line power to the electrical contactor, the latch actuator is configured to receive power from the power storage to unlatch the electrical contactor to prevent unexpected start of a load after the line power is restored.

8. The latching block as recited in claim 7, wherein the latch actuator includes a bistable mechanism, and wherein:

while the bistable mechanism is in a first stable position, the latch member is stable in the latched position without expending power;

while the bistable mechanism is in a second stable position, the latch member is stable in the unlatched position without expending power; and wherein the latch actuator can consume power to move the bistable mechanism between the first stable position and the second stable position, and between the second stable position and the first stable position.

9. The latching block as recited in claim 7, wherein the latching block includes:

a first connector for connecting the latching block to a positive power wire;

a second connector for connecting the latching block to a negative power wire;

a third connector for connecting to a positive coil connector of the electrical contactor;

a fourth connector for connecting to a negative coil connector of the electrical contactor; and a switching device electrically connected to the first connector and operatively connected to an unlatch circuit and to the third connector, wherein the switching device is configured to switch between a first state connecting the first connector electrically to the third connector and a second state connecting the first connector electrically to the unlatch circuit, wherein with the switching device in the first state the latching block energizes the contact actuator, and in the second state the latching block deenergizes the contact actuator and energizes the unlatch circuit.

10. The latching block as recited in claim 9, wherein the latching block is configured to detect a loss of power supplied to the first connector and the second connector;

supply power to the unlatch circuit to move the latch member to the unlatched position; and place the switching device into the first state for energizing the contact actuator upon return of power to the first connector and the second connector.

11. The latching block as recited in claim 10, wherein the latching block is configured to delay actuating the latch member to the latched position of the first contact and the second contact until the power storage is sufficiently charged to actuate the latch member from the latched position to the unlatched position for a future unlatching event.

12. The latching block as recited in claim 9, wherein the latching block is an add-on module for the electrical contactor, wherein the electrical contactor is configured to, while the latching block is absent, energize the contact actuator to move the first contact to the closed position when power is supplied to the positive coil and the negative coil connector, and to deenergize the contact actuator to return the first contact to the open position when power is not supplied to the positive coil connector and the negative coil connector.

13. The latching block as recited in claim 9, wherein the first connector includes a first lug and the second connector includes a second lug.

14. The latching block as recited in claim 13, wherein the third connector includes a third lug, the fourth connector includes a fourth lug, and the third lug and the fourth lug are configured to connect the latching block via respective wires to reciprocal lugs of the electrical contactor.

15. A method comprising:

detecting a loss of line power conducted through latched contacts of an electrical contactor;

in response to the loss of line power, drawing stored power from a power storage to unlatch the contacts, allowing the contacts to separate from one another under a bias force;

prior to detecting the loss of line power, conducting the line power through the contacts of the electrical contactor without expending power to maintain the contacts in a closed contact with one another, and maintaining a latched state of the contacts without expending power to maintain a latching unit in a latched position that latches the contacts in closed contact with one another;

in response to a return of line power after the loss of line power, initiating recharging of the power storage;

completing the recharging of the power storage, wherein the recharging of the power storage is complete upon enough energy being stored in the power storage to unlatch the contacts without use of the line power; and delaying latching the contacts until after completion of the recharging of the power storage, even if the contacts cycle between open and closed contact positions during recharging the power storage.

16. The method as recited in claim 15, further comprising:

maintaining the contacts in an open, separated state after return of line power until after receiving a command to close the contacts.

17. The method of claim 15, further comprising:

maintaining the latching unit stable in the latched position without expending power while a bistable mechanism of the latching unit is in a first stable position;

maintaining the latching unit stable in an unlatched position while the bistable mechanism is in a second stable position; and consuming power to move the bistable mechanism between the first stable position and the second stable position, and between the second stable position and the first stable position.

18. The method of claim 15, further comprising:

switching a switching device between a first state and a second state, wherein in the first state the latching unit energizes a contact actuator, and in the second state the latching unit deenergizes the contact actuator and energizes an unlatch circuit.

19. The method of claim 18, further comprising:

detecting a loss of power supplied to a first connector connecting the latching unit to a positive power wire and a second connector connecting the latching unit to a negative power wire; and supplying power to the unlatch circuit to move the latching unit to the unlatched position.

20. The method of claim 19, further comprising placing the switching device into the first state for energizing the contact actuator upon return of power to the first connector and the second connector.

* * * * *